(12) United States Patent
Pfeiffer et al.

(10) Patent No.: US 12,228,734 B2
(45) Date of Patent: Feb. 18, 2025

(54) OPTICAL SYSTEMS WITH FLARE-MITIGATING ANGULAR FILTERS

(71) Applicant: Apple Inc., Cupertino, CA (US)

(72) Inventors: Jonathan B. Pfeiffer, Lafayette, CO (US); Adam C. Urness, Boulder, CO (US)

(*) Notice: Subject to any disclaimer, the term of this patent is extended or adjusted under 35 U.S.C. 154(b) by 455 days.

(21) Appl. No.: 17/476,642

(22) Filed: Sep. 16, 2021

(65) Prior Publication Data

US 2022/0004006 A1 Jan. 6, 2022

Related U.S. Application Data

(63) Continuation of application No. PCT/US2020/050852, filed on Sep. 15, 2020.

(60) Provisional application No. 62/902,613, filed on Sep. 19, 2019.

(51) Int. Cl.
*G02B 27/01* (2006.01)
*G02B 6/34* (2006.01)

(52) U.S. Cl.
CPC ........... *G02B 27/0172* (2013.01); *G02B 6/34* (2013.01); *G02B 2027/0118* (2013.01); *G02B 2027/0174* (2013.01)

(58) Field of Classification Search
CPC ................. G02B 27/0172; G02B 6/34; G02B 2027/0118; G02B 2027/0174
USPC ...................................... 359/34, 630, 569, 15
See application file for complete search history.

(56) References Cited

U.S. PATENT DOCUMENTS

| | | | |
|---|---|---|---|
| 7,418,170 B2 | 8/2008 | Mukawa et al. | |
| 9,406,166 B2 | 8/2016 | Futterer | |
| 10,088,675 B1 | 10/2018 | Brown et al. | |
| 10,761,330 B2* | 9/2020 | Lee | G02B 27/0172 |
| 11,067,797 B2* | 7/2021 | Schowengerdt | G02B 27/0103 |
| 11,428,942 B2 | 8/2022 | Russell | |
| 2010/0214659 A1* | 8/2010 | Levola | G02B 6/0035 359/566 |
| 2013/0100362 A1 | 4/2013 | Saeedi et al. | |
| 2014/0104665 A1 | 4/2014 | Popovich et al. | |
| 2014/0140654 A1 | 5/2014 | Brown et al. | |

(Continued)

FOREIGN PATENT DOCUMENTS

| | | |
|---|---|---|
| CN | 108292042 A | 7/2018 |
| CN | 109073819 A | 12/2018 |
| CN | 208314330 U | 1/2019 |

*Primary Examiner* — Audrey Y Chang
(74) *Attorney, Agent, or Firm* — Treyz Law Group, P.C.; Michael H. Lyons; Jinie M. Guihan

(57) ABSTRACT

An electronic device may include a display with an optical combiner. The combiner may include a waveguide and a cross coupler on the waveguide. The combiner may redirect light from a display module to an eye box while passing world light to the eye box within a field of view. The cross coupler may include surface relief gratings or other broadband gratings. The combiner may include an angular filter that at least partially overlaps the cross coupler. The cross coupler may include surface relief grating structures or other broadband gratings. The angular filter may include angled absorbers or diffractive gratings. The angular filter may prevent world light that would otherwise produce distracting flares at the eye box (e.g., world light incident on the waveguide outside the field of view such as high-incident angle light from an overhead light source) from passing to the cross coupler.

20 Claims, 6 Drawing Sheets

(56) References Cited

U.S. PATENT DOCUMENTS

| | | | |
|---|---|---|---|
| 2015/0086163 A1* | 3/2015 | Valera | G02B 6/0035 |
| | | | 427/163.2 |
| 2018/0074457 A1 | 3/2018 | Jolly et al. | |
| 2019/0056593 A1 | 2/2019 | Bablumyan | |
| 2019/0064526 A1 | 2/2019 | Connor | |
| 2019/0101760 A1* | 4/2019 | Ayres | G02B 6/0038 |
| 2019/0227316 A1* | 7/2019 | Lee | G02B 6/0016 |
| 2019/0227321 A1 | 7/2019 | Lee et al. | |
| 2021/0116712 A1 | 4/2021 | Manly et al. | |
| 2021/0231951 A1 | 7/2021 | Dominguez et al. | |
| 2021/0278672 A1 | 9/2021 | Messer et al. | |
| 2021/0405402 A1 | 12/2021 | Cheng et al. | |
| 2022/0357580 A1 | 11/2022 | Russell | |

\* cited by examiner

OPTICAL SYSTEMS WITH FLARE-MITIGATING ANGULAR FILTERS

This application is a continuation of International Patent Application No. PCT/US2020/050852, filed Sep. 15, 2020, which claims the benefit of U.S. Provisional Patent Application No. 62/902,613, filed on Sep. 19, 2019, which are hereby incorporated by reference herein in their entireties.

BACKGROUND

This relates generally to optical systems and, more particularly, to optical systems for displays.

Electronic devices may include displays that present images close to a user's eyes. For example, devices such as virtual reality and augmented reality headsets may include displays with optical elements that allow users to view the displays.

It can be challenging to design devices such as these. If care is not taken, the components used in displaying content may be unsightly and bulky and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may include a display unit that generates light and an optical system that redirects the light from the display unit towards an eye box. The optical system may be an optical combiner that redirects light from the display unit towards the eye box while also passing real-world light within a field of view to the eye box. The optical combiner may include a waveguide, an input coupler on the waveguide, a cross coupler on the waveguide, and an output coupler on the waveguide. The cross coupler may include surface relief grating structures or other broadband gratings.

The waveguide may include first and second waveguide substrates and a grating medium between the first and second waveguide substrates. The output coupler may be formed in the grating medium. The waveguide may include a filter substrate layered over the first and/or second waveguide substrates. The filter layer may include an angular filter that at least partially overlaps the cross coupler. The angular filter may include angled absorbers in a "venetian blinds" configuration, dielectric coatings, or diffractive grating structures in the filter substrate. The angular filter may be configured to pass world light incident on the waveguide within the field of view. At the same time, the angular filter may be configured to prevent world light that would otherwise produce distracting flares at the eye box (e.g., world light incident on the waveguide outside the field of view such as high-incident angle light from an overhead light source) from passing to the cross coupler.

DETAILED DESCRIPTION

Figure 1:
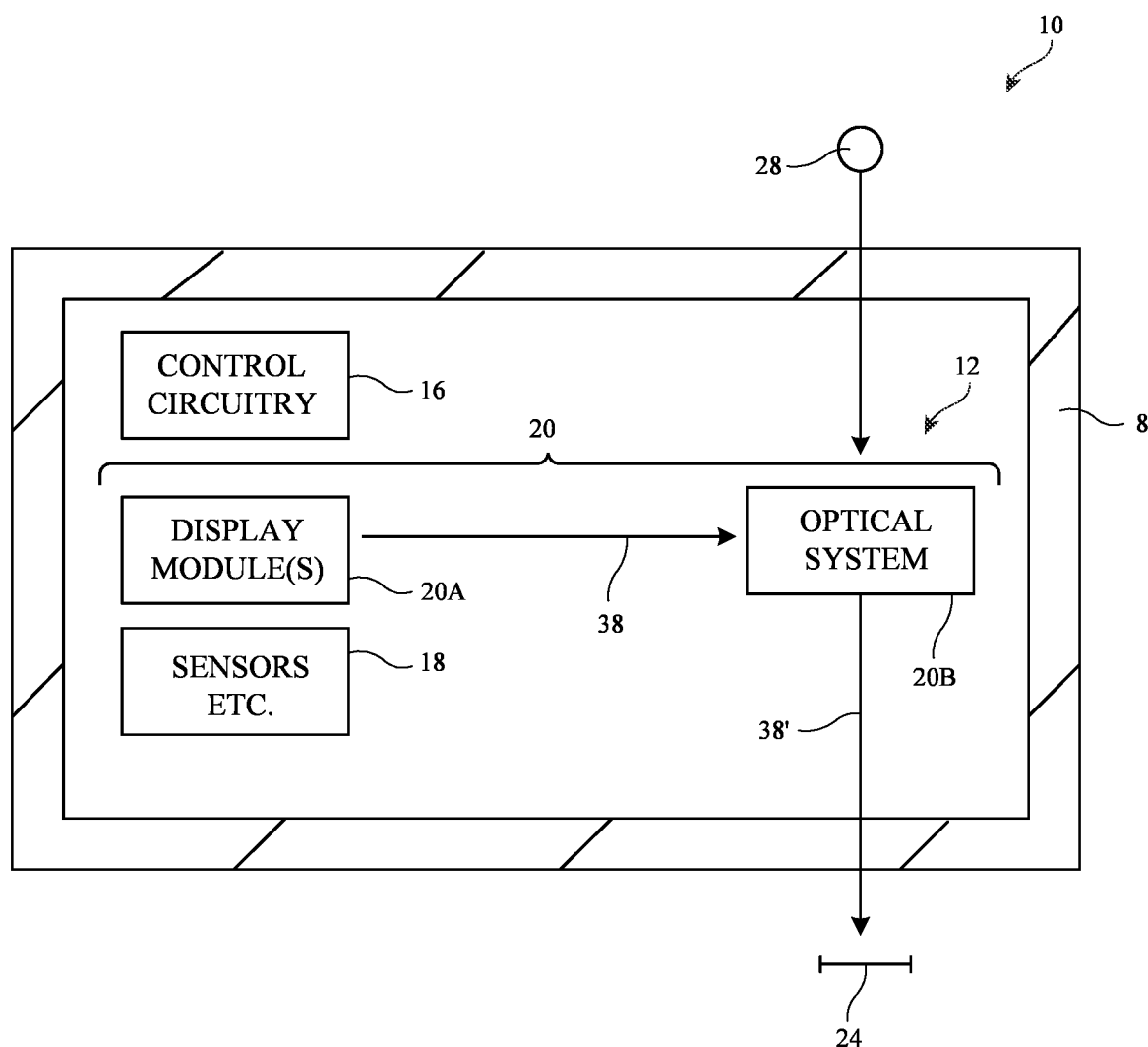
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 20 mounted within support structure (housing) 8. Support structure 8 may have the shape of a pair of eyeglasses (e.g., supporting frames), may form a housing having a helmet shape, or may have other configurations to help in mounting and securing the components of near-eye displays 20 on the head or near the eye of a user. Near-eye displays 20 may include one or more display modules such as display modules 20A and one or more optical systems such as optical systems 20B. Display modules 20A may be mounted in a support structure such as support structure 8. Each display module 20A may emit light 38 (image light) that is redirected towards a user's eyes at eye box 24 (as light 38') using an associated one of optical systems 20B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 20A may be liquid crystal displays, organic light-emitting diode displays, laser-based displays, reflective displays, or displays of other types. Optical systems 20B may form lenses that allow a viewer (e.g., a viewer's eyes at eye box 24) to view images on display(s) 20. There may be two optical systems 20B (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by optical system 20B may be selected so that any gap present between the displays will not be visible to a user (e.g., so that the images of the left and right displays overlap or merge seamlessly).

If desired, optical system 20B may contain components (e.g., an optical combiner, etc.) to allow real-world image light from real-world images or objects 28 to be combined optically with virtual (computer-generated) images such as virtual images in image light 38. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement which a camera captures real-world images of object 28 and this content is digitally merged with virtual content at optical system 20B).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2:
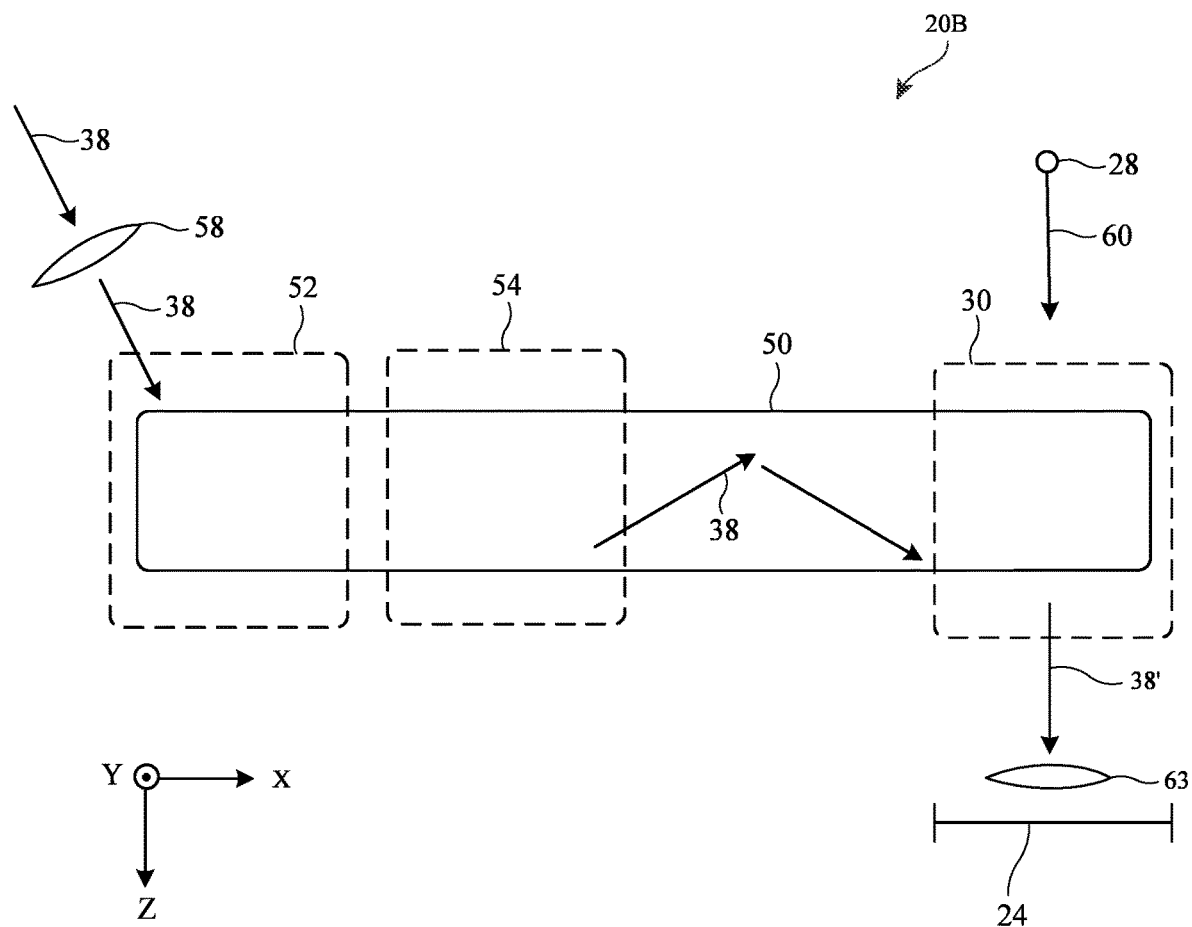
FIG. 2 is a top view of an illustrative optical system for a display that includes a waveguide, and input coupler, a cross coupler, and an output coupler in accordance with some embodiments.

FIG. 2 is a top view of an illustrative optical system 20B that may be used in system 10 of FIG. 1. As shown in FIG. 2, optical system 20B may include optical elements such as waveguide 50, input optics 58, output optics 63, input coupler 52, cross coupler 54, and output coupler 56. Input optics 58 may include collimating lenses or other optical components that pass image light 38 to input coupler 52. Image light 38 may be provided to optical system 20B by a display unit in display module 20A (FIG. 1). The display unit may be a display unit based on a liquid crystal display, organic light-emitting diode display, cathode ray tube, plasma display, projector display (e.g., a projector based on an array of micromirrors), liquid crystal on silicon display, or other suitable type of display. Optical system 20B may be used to present light 38 output from the display unit to eye box 24.

Waveguide structures such as waveguide 50 in optical system 20B may be formed from one or more stacked layers of polymer, glass, or other transparent substrates capable of guiding light via total internal reflection. Input coupler 52, cross coupler 54, and output coupler 56 may each be partially or completely embedded within waveguide 50 or mounted to a surface of waveguide 50. Some of optical couplers 52, 54, and 56 may be mounted to a surface of waveguide 50 whereas others of couplers 52, 54, and 56 are embedded within waveguide 50. One or more of couplers 52, 54, and 56 may be omitted if desired. Output optics 63 may include lenses that help to focus light 38 coupled out of waveguide 50 by output coupler 56 onto eye box 24. Input optics 58 and/or output optics 63 may be omitted if desired.

Input coupler 52 may be configured to couple light 38 from the display module into waveguide 50, whereas output coupler 56 may be configured to couple light 38 from within waveguide 50 out of waveguide 50 and towards eye box 24 (as light 38'). For example, when light 38 from input optics 58 strikes input coupler 52, input coupler 52 may redirect light 38 so that the light propagates within waveguide 50 via total internal reflection towards output coupler 56 (e.g., in the direction of the X axis). When light 38 strikes output coupler 56, output coupler 56 may redirect light 38 out of waveguide 50 towards eye box 24 (e.g., along the Z axis as light 38').

In the example of FIG. 2, cross coupler 54 is optically interposed between input coupler 52 and output coupler 56. In this example, input coupler 52 may redirect light 38 towards cross coupler 54. Cross coupler 54 may expand light 38 in a first direction and may also couple (redirect) the expanded light back into waveguide 50. Waveguide 50 propagates the light expanded by cross coupler 54 via total internal reflection to output coupler 56. If desired, output coupler 56 may then expand the light received from cross coupler 54 in a second direction that is different from (e.g., perpendicular to) the first direction. Output coupler 56 may, if desired, provide an optical power to the light coupled out of the waveguide. Consider an example in which the light 38 coupled into waveguide 50 by input coupler 52 includes a pupil of light. Expansion of light 38 by cross coupler 54 and output coupler 56 may serve to expand the pupil in multiple (e.g., orthogonal) dimensions, thereby allowing a relatively large eye box 24 to be filled with pupils of light 38 with a sufficient and substantially uniform intensity across the entire area of the eye box.

Input coupler 52, cross coupler 54, and output coupler 56 may be based on reflective and refractive optics or may be based on holographic (e.g., diffractive) optics. In arrangements where couplers 52, 54, or 56 are formed from reflective and refractive optics, the couplers may include one or more reflectors (e.g., an array of micromirrors, partial mirrors, or other reflectors). In arrangements where couplers 52, 54, or 56 are based on holographic optics, couplers 52, 54, and 56 may include holographic media such as photopolymers, gelatin such as dichromated gelatin, silver halides, holographic polymer dispersed liquid crystal, or other suitable volume holographic media. Holographic recordings (e.g., holographic phase gratings sometimes referred to herein as holograms) may be stored in the holographic media. The holographic media may sometimes be referred to herein as grating media.

A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a nonswitchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of grating medium if desired. The holographic phase gratings may be, for example, volume holograms in the grating medium.

If desired, one or more of couplers 52, 54, and 56 may be implemented using other types of diffraction grating structures such as surface relief grating structures. Surface relief grating structures include diffraction gratings (e.g., surface relief gratings) that are mechanically cut, etched, or otherwise formed in a surface relief grating medium. The surface relief gratings diffract light that is incident upon the surface relief gratings. Rather than modulating index of refraction in the grating medium (as performed to create holographic phase gratings such as volume holograms), surface relief gratings are produced by varying the physical thickness of the medium across its lateral area. Multiple surface relief gratings (e.g., two surface relief gratings) may be multiplexed within the same volume of surface relief grating medium if desired. Meta-gratings may be used in another suitable arrangement.

In one suitable arrangement that is sometimes described herein as an example, input coupler 52 is a non-diffractive input coupler (e.g., an input coupler that does not include diffraction gratings such as surface relief gratings or holographic phase gratings). For example, input coupler 52 may include an input prism (e.g., a transmissive or reflective prism), an angled surface (edge) of waveguide 50, etc. Use of a non-diffractive input coupler such as an input prism may allow light 38 to be coupled into waveguide 50 without producing the chromatic dispersion that is otherwise associated with input-coupling using diffractive elements. In another suitable arrangement, input coupler 52 may be formed using diffraction gratings such as volume holograms or other grating structures. In these scenarios, any chromatic dispersion introduced by the input coupler may be reversed by the output coupler in diffracting the light out of the waveguide (e.g., in a scenario where the output coupler includes holographic phase gratings such as volume holograms).

Cross coupler 54 may include diffractive grating structures that diffract the light 38 coupled into waveguide 50 by the (non-diffractive) input coupler 52. The grating structures in cross coupler 54 may include surface relief grating structures (e.g., one or more surface relief gratings) or phase grating structures such as volume holographic grating structures (e.g., a set of at least partially overlapping volume holograms). In one suitable arrangement, the grating structures in cross coupler 54 may be configured to diffract light 38 an even number of times. At least one of the diffractions may serve to expand light 38 in a first direction (e.g., along the Y axis into and/or out of the plane of FIG. 2). At least one of the diffractions may serve to redirect the expanded light back into waveguide 50 at an angle such that the light propagates by total internal reflection to output coupler 54. By diffracting the light an even number of times, any chromatic dispersion effects associated with diffracting the light one time can be reversed by diffracting the light a corresponding subsequent time. This may serve to mitigate chromatic dispersion of the light that is conveyed to output coupler 56.

Output coupler 56 may include diffractive grating structures such as volume holographic grating structures or other holographic phase gratings. In another suitable arrangement, output coupler 56 may include reflective mirror structures such as a louvred mirror. Output coupler 56 may reflect or diffract light 38. The reflection/diffraction of light 38 by output coupler 56 may serve to expand light 38 in a second direction (e.g., along the X axis) and to couple the expanded light out of waveguide 50 towards eye box 24.

In the example of FIG. 2, waveguide 50 is an optical combiner that combines real-world light 60 (sometimes referred to herein as environmental light 60 or world light 60) with image light 38 from display module 20A (e.g., for an augmented reality display system). In this scenario, output coupler 56 may provide light 38' to eye box 24. Light 38' may include both the image light 38 that propagates down waveguide 50 via total internal reflection and world light 60 from external real-world objects 28 (e.g., light 38' may superimpose digitally-generated image data with light from a real world scene in front of system 10).

Figure 3:
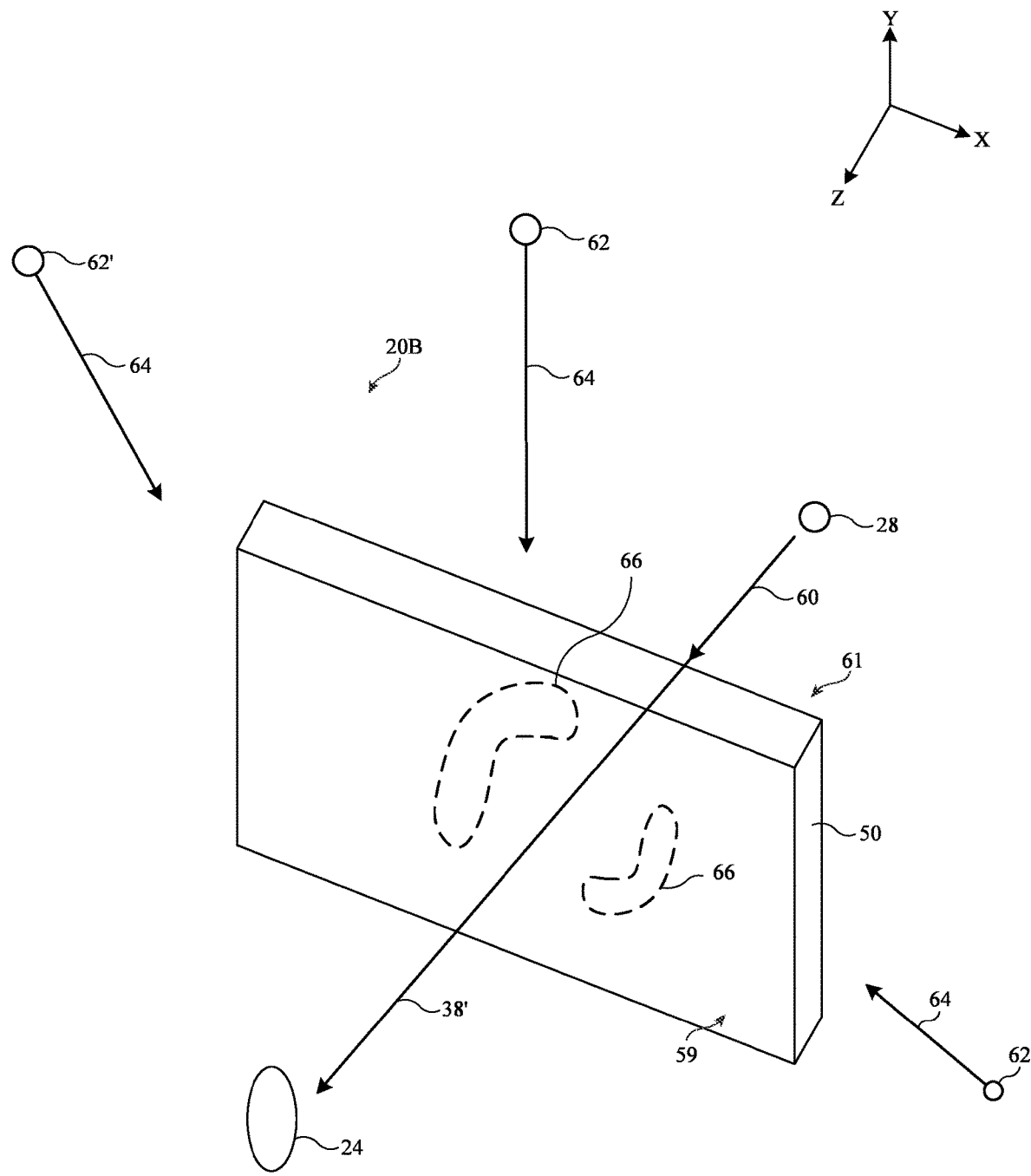
FIG. 3 is a perspective view of an illustrative waveguide that may direct image light and world light to an eye box in accordance with some embodiments.

In an augmented reality system of the type shown in FIG. 2, if care is not taken, real world light incident on waveguide 50 at certain angles may produce undesirable flare light that would otherwise not naturally reach eye box 24. FIG. 3 is a perspective view of waveguide 50 showing how some real world light may produce undesirable flare light.

As shown in FIG. 3, world light 60 from real-world objects 28 may pass through waveguide 50 to eye box 24 (e.g., as part of light 38'). Waveguide 50 may be configured to provide world light 60 to eye box 24 within a corresponding field of view (e.g., a field of view of the display). It may be desirable for the field of view to be as large as possible (e.g., to allow the viewer to view as much content as possible).

However, world light incident on waveguide 50 at certain angles such as world light 64 may produce undesirable flare light such as flare light 66 (sometimes referred to herein as flares 66). Flare light 66 may pass to eye box 24 (e.g., via diffraction by diffractive optical elements on waveguide 50 such as the cross coupler on waveguide 50 and/or by transmission through waveguide 50). This may cause distracting flares to appear within the user's vision at eye box 24, despite world light 64 being incident on waveguide 50 outside of the field of view of eye box 24 (e.g., world light 64 would not otherwise be viewable at eye box 24).

As shown in FIG. 3, world light 64 may be incident from in front of waveguide 50 (e.g., from objects 62 located within the hemisphere in front of waveguide 50 and opposite to eye box 24). World light 64 may additionally or alternatively be incident from behind waveguide 50 (e.g., from objects 62' located within the hemisphere behind waveguide 50). World light 64 may generally be incident at any angle such that it produces flares light 66 visible at eye box 24 (e.g., world light 64 may be incident from outside of the field of view of eye box 24 and display 20). In practice, world light 64 may be incident at relatively high angles with respect to a normal axis (e.g., parallel to the Z-axis) of the lateral surface of waveguide 50 (e.g., the planar surface of waveguide 50 lying in the X-Y plane of FIG. 3). As examples, world light 64 may be incident at angles relative to the normal axis that are greater than 25 degrees, greater than 26 degrees, greater than 30 degrees, greater than 40 degrees, greater than 45 degrees, greater than 60 degrees, etc. World light 64 may therefore sometimes be referred to herein as flare-inducing world light 64 or high-angle world light 64. Objects 62 and 62' may include, for example, overhead lights (e.g., ceiling lights or lights over the user's head), the sun, the moon, and/or any other reflective and/or emissive objects that produce flare-inducing world light 64.

Figure 4:
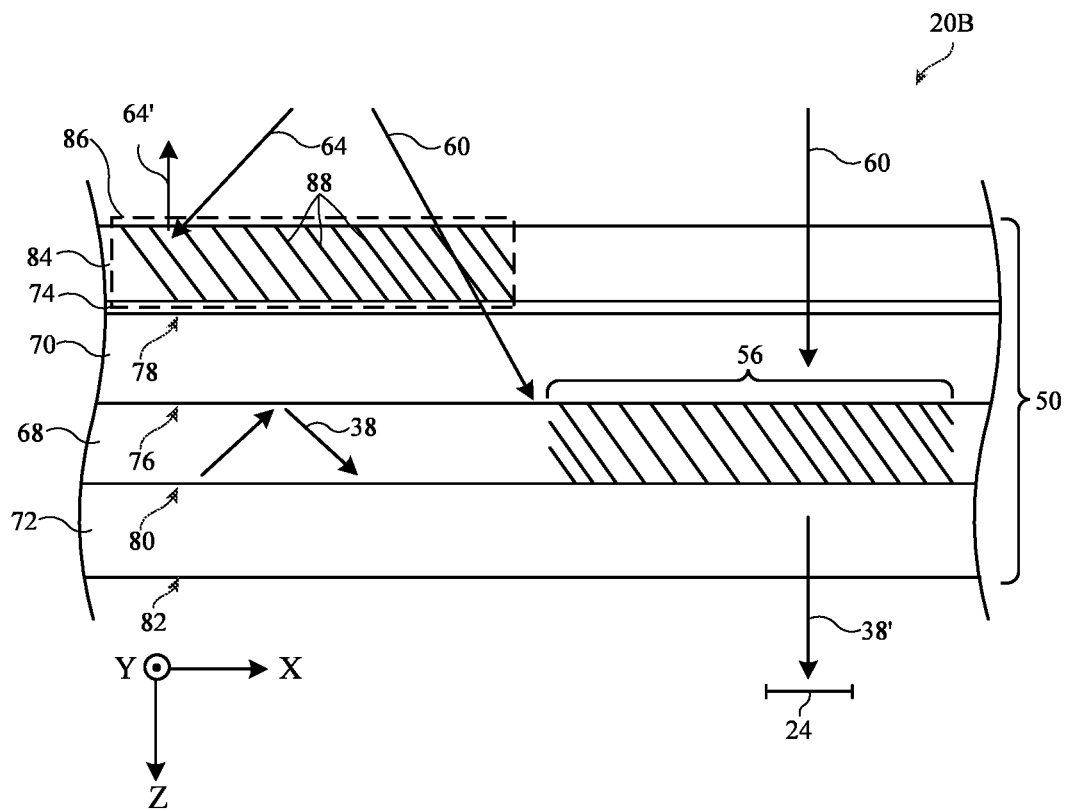
FIG. 4 is a top view of an illustrative waveguide having an outward-facing angular filter for mitigating image flares viewable at an eye box in accordance with some embodiments.

In order to minimize the presence of distracting flare light 66 at eye box 24, waveguide 50 may include an angular filter that prevents flare light 66 from forming responsive to receipt of flare-inducing image light 64 at waveguide 50. FIG. 4 is a top view showing one example of an angular filter that may be provided on waveguide 50 for mitigating flare light 66.

As shown in FIG. 4, waveguide 50 may include one or more waveguide substrates such as substrates 70 and 72. Waveguide substrates 70 and 72 may be transparent. A holographic recording medium such as grating medium 68 may be interposed (layered) between substrates 70 and 72. Lateral (e.g., planar) surface 80 of grating medium 68 may (directly) contact substrate 72. Lateral surface 76 of grating medium 68 may (directly) contact substrate 70. Output coupler 56 may be formed within grating medium 68 (e.g., using volume holograms or other holographic phase gratings recorded in grating medium 68, louvred mirrors embedded in grating medium 68, etc.). If desired, an optional antireflection coating may be layered onto surface 80 and/or surface 76 at output coupler 56. The antireflection coating(s) may prevent unwanted light reflections within grating medium 68 during the writing (recording) of the holographic phase gratings within output coupler 56, for example.

Image light 38 may be coupled into waveguide 50 (e.g., using input coupler 52 of FIG. 2) and may propagate in the X direction via total internal reflection. Output coupler 56 may direct (e.g., diffract) the image light out of waveguide 50 and towards eye box 24 as a part of light 38'. Light 38' may also include world light 60 received through substrate 70.

An angular filter such as angular filter 86 may be formed on or within a substrate 84 (sometimes referred to herein as angular filter substrate 84 or filter substrate 84) layered over lateral surface 78 of substrate 70. Substrate 84 may be separated from surface 78 by air gap 74 or may be adhered to surface 78 using optically clear adhesive.

Substrate 84 may include one or more angular filters such as angular filter 86. Angular filter 86 may formed within a lateral region of waveguide 50 that is optically interposed between the input coupler and output coupler 56 (e.g., within the portion of waveguide 50 that propagates light 38 via total internal reflection before the light is coupled out of the waveguide). This is merely illustrative and, in general, angular filter 86 may surround one or more lateral sides (e.g., all lateral sides) of output coupler 56 if desired. Angular filter 86 need not occupy all of substrate 84. Angular filter 86 may be non-overlapping with respect to output coupler 56 or may partially or completely overlap output coupler 56.

In one suitable arrangement, angular filter 86 may include angled (slanted or tilted) absorbers such as angled absorbers 88. Angled absorbers 88 may have lateral areas that are oriented at a non-parallel angle with respect to lateral surface 78 and/or at a non-parallel angle with respect to the normal axis of lateral surface 78. Angled absorbers may additionally or alternatively be tilted out of the plane of the page if desired (e.g., the normal axis of the angled absorbers may be oriented at a non-zero angle within the X-Z plane with respect to the −Z axis and/or at a non-zero angle within the Y-Z plane with respect to the −Z axis).

Angled absorbers 88 may include absorptive (e.g., black or opaque) material (e.g., metallic and/or dielectric coatings) that blocks light incident on a lateral area of the absorbers. The angle of angled absorbers 88 may be selected to allow world light 60 to pass through layer 84 (e.g., where the world light may be coupled out of the waveguide by output coupler 56 as part of light 38') while also blocking (absorbing) flare-inducing world light 64 (e.g., the angle of angled absorbers 88 may be such that flare-inducing world light 64 is incident upon the lateral area of angled absorbers 88 and is thereby absorbed by angled absorbers 88). Angular filter 86 may include multiple sets of angled absorbers 88 at different angles (e.g., for blocking different rays of flare-inducing world light 64) that are non-overlapping or partially or completely overlapping (e.g., multiplexed). In this way, angled absorbers 88 may be provided in a "venetian blinds" configuration that blocks flare-inducing image light from passing through waveguide 50 (and thus from producing flare light 66 of FIG. 3) while still allowing world light 60 that is intended to be received at eye box 24 to be viewable by a user. This may limit the presence of distracting flares to the user while still allowing the user to view real world light 60 over a relatively large field of view.

In another suitable arrangement, angular filter 86 may include diffractive grating structures (e.g., substrate 84 may be a grating medium). The diffractive grating structures may include one or more diffractive gratings that are non-overlapping or partially or completely overlapping (multiplexed). The diffractive gratings may include phase gratings such as volume holograms, thin film holograms, other holograms, meta-gratings, surface relief gratings (e.g., gratings formed from grooves or notches in one of the surfaces of substrate 84), three-dimensional metal structures patterned onto one of the surfaces of substrate 84, or other diffractive gratings.

In this arrangement, the diffractive gratings may be configured to diffract flare-inducing world light 64 away from output coupler 56 without also diffracting world light 60 intended to be received at eye box 24. For example, the diffractive gratings in angular filter 86 may be Bragg-matched or nearly-Bragg-matched to flare-inducing world light 64 (e.g., to light incident at the incident angles of flare-inducing world light 64) without being Bragg-matched to world light 60 (e.g., to light incident at the incident angles of world light 60). The diffractive gratings in angular filter 86 may diffract flare-inducing world light 64 at an output angle that is not oriented towards output coupler 56 (e.g., away from the operating input angles of cross coupler 54 in scenarios where cross coupler 54 is included in waveguide 50). For example, the diffractive gratings may diffract (reflect) flare-inducing world light 64 away from waveguide 50, as shown by ray 64' (e.g., the diffractive gratings may include reflection holograms). In another suitable arrangement, the diffractive gratings may include transmission holograms that diffract flare-inducing world light 64 at output angles such that the flare-inducing world light 64 does not produce flare light 66 of FIG. 3. The diffractive gratings may include multiple (e.g., multiplexed) gratings that each diffract a corresponding wavelength range of light (e.g., so that angular filter 86 may diffract all flare-inducing world light 64 at all of the colors produced by objects 62 of FIG. 3). Angular filter 86 may, for example, include one or more gratings overlapping (superimposed) within the same volume of substrate 84, four or more gratings overlapping within the same volume of substrate 84, six or more gratings overlapping within the same volume of substrate 84, 40 or more gratings overlapping within the same volume of substrate 84, 100 or more gratings overlapping within the same volume of substrate 84, 1000 or more gratings overlapping within the same volume of substrate 84, etc. In another suitable arrangement, angular filter 86 may be formed from one or more dielectric coatings.

Figure 5:
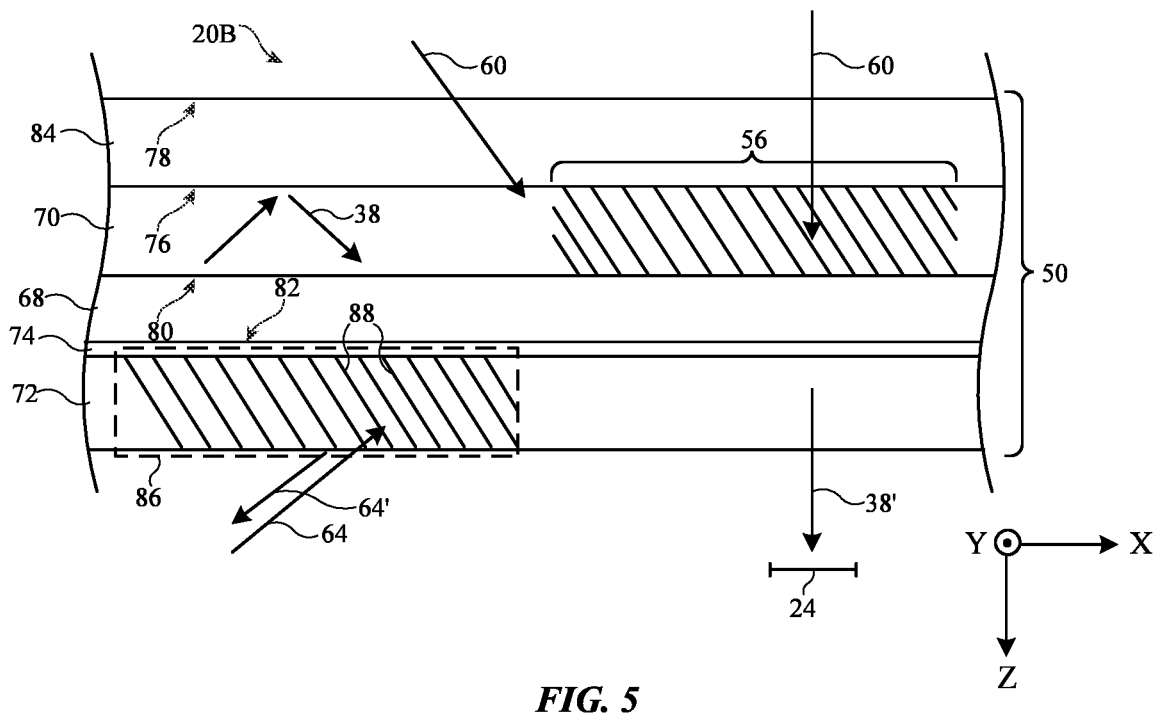
FIG. 5 is a top view of an illustrative waveguide having an inward-facing angular filter for mitigating image flares viewable at an eye box in accordance with some embodiments.

In another suitable arrangement, substrate 84 and angular filter 86 may be layered under lateral surface 82 of substrate 72 (e.g., at the same side of waveguide 50 as eye box 24). FIG. 5 is a top view of waveguide 50 in an example where substrate 84 and angular filter 86 are layered under lateral surface 82 of substrate 72.

As shown in FIG. 5, substrate 84 may be layered under lateral surface 82 of substrate 72. Substrate 84 may be separated from surface 82 by air gap 90 or may be adhered to surface 82 using optically clear adhesive. In scenarios where angular filter 86 includes angled absorbers 88, angled absorbers 88 may be oriented to block flare-inducing world light 64 incident upon waveguide 50 from the rear (e.g., from the side of waveguide 50 facing eye box 24). This flare-inducing world light may, for example, be produced by objects 62' of FIG. 3. In scenarios where angular filter 86 includes diffractive gratings, the diffractive gratings may diffract flare-inducing world light 64 at output angles that do not produce flare light 66 of FIG. 3 (e.g., as shown by diffracted ray 64' of FIG. 5).

Figure 6:
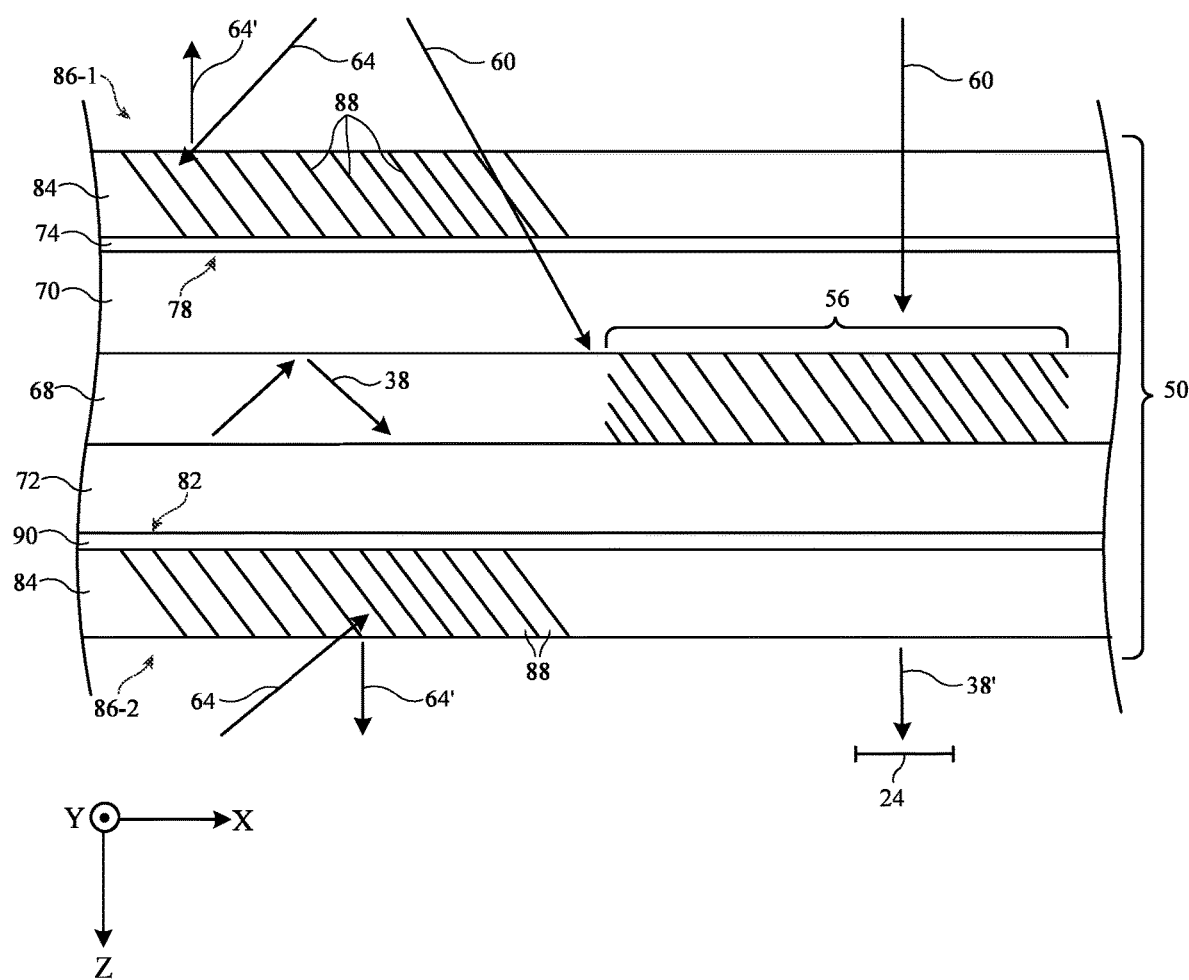
FIG. 6 is a top view of an illustrative waveguide having inward-facing and outward-facing angular filters for mitigating image flares viewable at an eye box in accordance with some embodiments.

In another suitable arrangement, as shown in FIG. 6, the arrangement of FIGS. 4 and 5 may be combined so that waveguide 50 includes angular filters 86 at both the front and rear of waveguide 50. As shown in FIG. 6, waveguide 50 may include a first angular filter 86-1 formed on a first substrate 84 layered over substrate 70 (e.g., as shown in FIG. 4) and may include a second angular filter 86-2 formed on a second substrate 84 layered under substrate 72 (e.g., as shown in FIG. 5). The angular filters of FIG. 6 may, for example, collectively prevent flare-inducing world light 64 from both objects 62 and 62' of FIG. 3 from producing flare light 66.

The examples of FIGS. 4-6 are merely illustrative. If desired, two or more substrates 84 each with their own angular filters 86 may be layered over substrate 70 and/or under substrate 84. Waveguide 50 may include any desired number of angular filters in any desired number of substrates 84. Additional substrates may be layered over and/or under substrate 84 (e.g., substrate 84 may include a grating medium interposed between the additional substrates). Substrate 84 may be mounted to other waveguides in display 20. Waveguide 50 may be curved if desired. One or more spacers may be interposed in air gap 74 of FIGS. 4 and 6 and/or in air gap 5 of FIG. 5 to help maintain a separation between substrate 84 and substrates 70 and/or 72.

Figure 7:
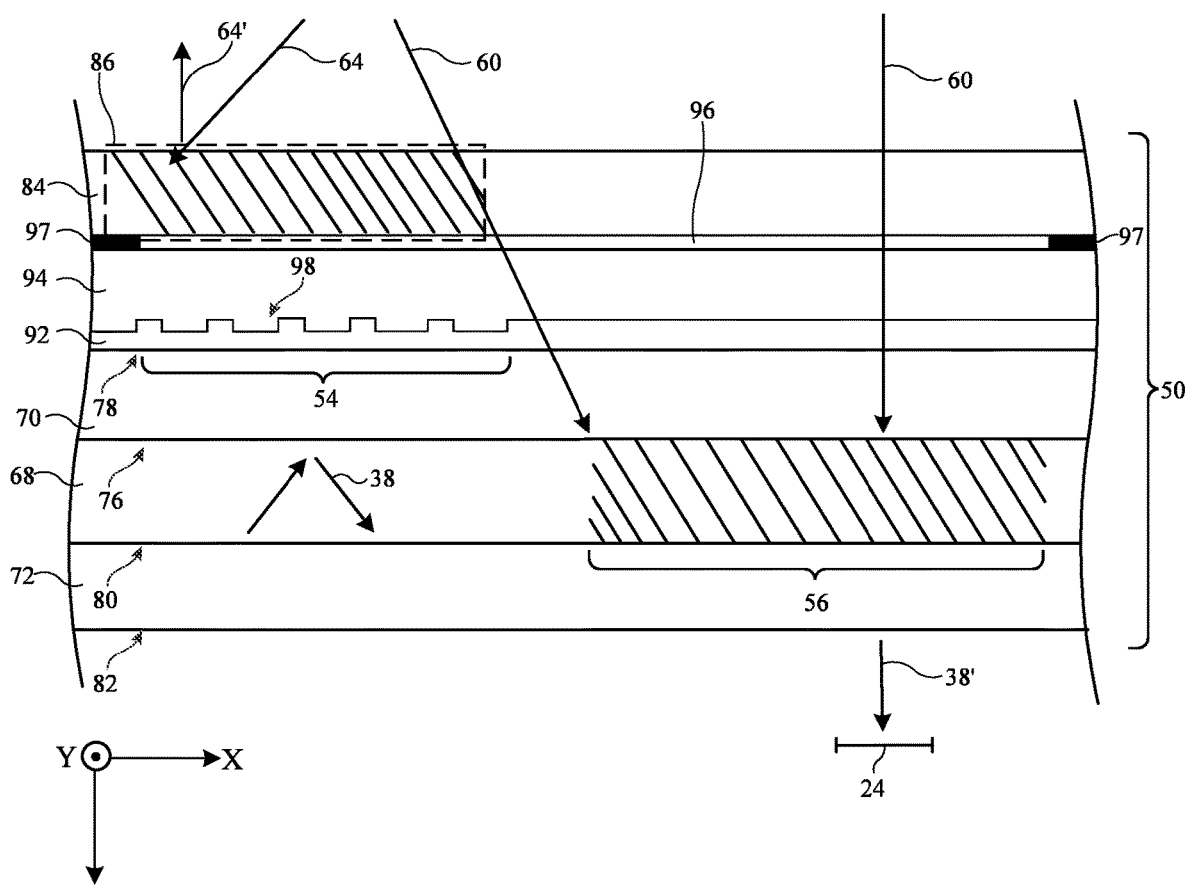
FIG. 7 is a top view of an illustrative waveguide having a cross coupler with a surface relief grating and having an angular filter for mitigating image flares viewable at an eye box in accordance with some embodiments.

If desired, one or more substrates used in forming cross coupler 54 of FIG. 2 may be interposed between substrate 84 and substrates 70 and/or 72. FIG. 7 is a top view showing how a substrate used in forming cross coupler 54 of FIG. 2 may be interposed between substrate 84 and substrate 70.

As shown in FIG. 7, an additional substrate such as substrate 94 may be layered over lateral surface 78 of substrate 70. Substrate 94 may include diffractive grating structures that are used in forming cross coupler 54 of FIG. 2. The diffractive grating structures may include, for example, volume holograms, thin film holograms, or other holograms (e.g., substrate 94 may be a grating medium), surface relief gratings, or other grating structures. In the example of FIG. 7, substrate 94 is used to form surface relief grating structures 98 for the cross coupler. Surface relief grating structures 98 may include one or more surface relief gratings defined by ridges (peaks) and troughs (minima) in the thickness of substrate 94 (sometimes referred to herein as surface relief grating substrate 94 or cross coupler substrate 94).

In the example of FIG. 7, surface relief grating structures 98 are binary structures in which the grating is defined either by a first thickness associated with the peaks or a second thickness associated with troughs. This is merely illustrative. If desired, surface relief grating structures 98 may be non-binary (e.g., may include any desired number of thicknesses following any desired profile, may include peaks that are angled at non-parallel fringe angles with respect to the Y axis, etc.).

Substrate 94 may exhibit a relatively high index of refraction (e.g., an index of refraction greater than the bulk index of refraction of grating medium 68). Substrate 94 may be adhered to surface 70 of substrate 70 using optically clear adhesive layer 92 or may be separated from surface 78 by an air gap. In another suitable arrangement, substrate 94 may include non-diffractive (e.g., reflective) structures used in forming cross coupler 54 (FIG. 2) such as louvered mirrors.

As shown in FIG. 7, substrate 84 having angular filter 86 may be layered over substrate 94. Substrate 84 may be separated from substrate 94 by air gap 96 or may be adhered to substrate 94 using optically clear adhesive. Spacers such as spacers 97 may be formed within air gap 96 for maintaining a separation between substrates 94 and 84. Because surface relief gratings such as surface relief grating structures 98 of FIG. 7 are broad band diffractors that diffract relatively wide bandwidths of light, surface relief grating structures 98 may be particularly susceptible to flare-inducing world light 64 (e.g., surface relief grating structures 98 may produce flare light 66 of FIG. 3 in response to receiving flare-inducing world light 64). Angular filter 86 may partially or completely overlap surface relief grating structures 98 and thus cross coupler 54 of FIG. 2. Angular filter 86 may block or diffract flare-inducing light 64 to keep flare-inducing light 64 from passing to substrate 94 and surface relief grating structures 98, thereby mitigating flare light 66 of FIG. 3. At the same time, angular filter 86 may allow world light 60 to pass through substrate 84 and substrate 94 without blocking or diffracting world light 60.

The example of FIG. 7 is merely illustrative. Substrate 94 may be layered under substrate 72 if desired. Surface relief grating structures 98 may be formed in the surface of substrate 94 facing grating medium 68 or in the surface of substrate 94 facing away from grating medium 68. Substrate 84 and angular filter 86 may be layered under surface 82 of substrate 72 (or under substrate 94 in scenarios where substrate 94 is layered under substrate 72). Waveguide 50 may include multiple substrates 94 each with respective surface relief grating structures (e.g., multiple substrates 94 stacked over substrate 70 or under substrate 72, a first substrate 94 stacked over substrate 70 and a second substrate 94 stacked under substrate 72, etc.). In general, waveguide 50 may include any desired number of substrates 94 layered on one or both sides of grating medium 68 and any desired number of substrates 84 layered on one or both sides of grating medium 68 (e.g., where substrate 94 is interposed between grating medium 68 and at least one substrate 84).

In another suitable arrangement, waveguide 50 may include both a substrate 84 and angular filter 86 over substrate 94 and an additional substrate and angular filter under substrate 72 (e.g., as shown in FIG. 6). Surface relief grating structures 98 need not be formed on a separate substrate 94 and may, if desired, be patterned in surface 78 of substrate 70, in surface 76 of substrate 70 (e.g., surface relief grating structures 98 may be embedded within grating medium 68), in surface 80 of substrate 72, or in surface 82 of substrate 72. Cross coupler 54 may include multiple surface relief grating structures in different surfaces of waveguide 50 (e.g., in one or both surfaces of one or more substrates 94 on one or both sides of grating medium 68, surface 78, surface 76, surface 80, and/or surface 82). In another suitable arrangement, angular filter 86 may be non-overlapping with surface relief grating structures 98 and cross coupler 54 of FIG. 4.

When configured in this way, the one or more angular filters 86 in waveguide 50 may prevent flare-inducing world light 64 from creating distracting flare light 66 (FIG. 3) at eye box 24, while still allowing world light 60 over a relatively wide field of view to pass to eye box 24. Offloading the filtering of flare-inducing world light 64 to angular filter(s) 86 may allow the grating structures in grating medium 68 and/or substrate 94 to be optimized for expanding the field of view of eye box 24, accommodating the small form factor of system 10, maximizing throughput, and/or optimizing color uniformity rather than filtering flare-inducing world light 64.

In accordance with an embodiment, an optical combiner configured to redirect display light produced by a display module towards an eye box and configured to pass world light towards the eye box, the optical system is provided that includes a waveguide having a grating medium interposed between first and second waveguide substrates, an input coupler configured to couple the display light into the waveguide, an output coupler in the grating medium and configured to couple the display light out of the waveguide, a cross coupler on the waveguide and configured to diffract the display light towards the output coupler, and an angular filter on the waveguide and at least partially overlapping the cross coupler, the angular filter is configured to transmit the world light while preventing flare-inducing world light from passing to the cross coupler.

In accordance with another embodiment, the cross coupler includes a surface relief grating.

In accordance with another embodiment, the output coupler includes volume holograms.

In accordance with another embodiment, the optical combiner includes a filter substrate that includes the angular filter and that is layered over the cross coupler.

In accordance with another embodiment, the angular filter includes a plurality of angled absorbers embedded in the filter substrate.

In accordance with another embodiment, the world light is incident upon the waveguide within a field of view of the eye box, the flare-inducing world light is incident upon the waveguide outside the field of view, and the plurality of angled absorbers are oriented to block the flare-inducing world light incident outside the field of view without blocking the world light incident within the field of view.

In accordance with another embodiment, the angular filter includes diffractive grating structures in the substrate.

In accordance with another embodiment, the world light is incident upon the waveguide at first angles within a field of view of the eye box, the flare-inducing world light is incident upon the waveguide at second angles outside the field of view, and the diffractive grating structures are Bragg-matched to light incident upon the waveguide and are configured to diffract the flare-inducing world light away from the cross coupler.

In accordance with another embodiment, the diffractive grating structures include a grating structure selected from the group consisting of a thin-film hologram, a volume hologram, a meta-grating, and a surface relief grating.

In accordance with another embodiment, the cross coupler is formed in a cross coupler substrate, the filter substrate is separated from the cross coupler substrate by an air gap, and the optical combiner includes a spacer in the air gap that separates the filter substrate from the cross coupler substrate.

In accordance with another embodiment, the optical combiner includes a cross coupler substrate, the cross coupler includes a diffractive grating on the cross coupler substrate, and a filter substrate that includes the angular filter and that is layered over the cross coupler, the cross coupler substrate is interposed between the first waveguide substrate and the filter substrate.

In accordance with an embodiment, an optical system is provided that includes a first waveguide substrate, a second waveguide substrate, a grating medium interposed between the first and second waveguide substrates, an output coupler formed in the grating medium, the output coupler being configured to transmit real-world light while diffracting image light towards an eye box, the eye box has a corresponding field of view, a filter substrate layered over the first waveguide substrate, and an angular filter in the filter substrate, the angular filter is configured to prevent real-world light incident outside the field of view from passing through the filter substrate.

In accordance with another embodiment, the angular filter is configured to transmit the real-world light incident within the field of view.

In accordance with another embodiment, the first waveguide substrate is interposed between the filter substrate and the grating medium and the grating medium is interposed between the first waveguide substrate and the eye box.

In accordance with another embodiment, the angular filter includes structures selected from the group consisting of diffractive grating structures configured to diffract the real-world light incident outside the field of view away from the first waveguide substrate, and angled absorber structures oriented at an angle that configures the angled absorber structures to block the real-world light incident outside the field of view while transmitting the real-world light incident within the field of view.

In accordance with another embodiment, the first waveguide substrate is interposed between the filter substrate and the grating medium and the first waveguide substrate is interposed between the grating medium and the eye box.

In accordance with another embodiment, the angular filter includes structures selected from the group consisting of diffractive grating structures and angled absorber structures.

In accordance with another embodiment, the optical system includes a cross coupler that at least partially overlaps the angular filter.

In accordance with an embodiment, a display is provided that includes a waveguide configured to propagate image light via total internal reflection and configured to transmit world light towards an eye box, a cross coupler including surface relief grating structures on the waveguide, the surface relief grating structures being configured to diffract the image light, and an angular filter on the waveguide and at least partially overlapping the surface relief grating structures, the angular filter is configured to block, from passing to the surface relief grating structures, world light at an incident angle that produces a flare at the eye box.

In accordance with another embodiment, the angular filter includes structures selected from the group consisting of diffractive grating structures and angled absorber structures.

The foregoing is merely illustrative and various modifications can be made to the described embodiments. The foregoing embodiments may be implemented individually or in any combination.

What is claimed is:

1. An optical combiner configured to redirect display light produced by a display module and configured to transmit world light, the optical combiner comprising:

a waveguide having a grating medium interposed between waveguide substrates, wherein the waveguide is configured to propagate the display light via total internal reflection;

an input coupler configured to couple the display light into the waveguide;

an output coupler in the grating medium and configured to couple the display light out of the waveguide, wherein the grating medium has a first index of refraction;

a cross coupler on the waveguide and configured to diffract the display light towards the output coupler, wherein the cross coupler comprises a surface relief grating embedded in an additional substrate and wherein the additional substrate has a second index of refraction greater than the first index of refraction; and an angular filter on the waveguide and at least partially overlapping the cross coupler, wherein the angular filter is configured to transmit the world light while preventing flare-inducing world light from passing to the cross coupler.

2. The optical combiner defined in claim 1, wherein the output coupler comprises volume holograms.

3. The optical combiner defined in claim 1, further comprising:
a filter substrate that includes the angular filter and that is layered over the cross coupler.

4. The optical combiner defined in claim 3, wherein the angular filter comprises a plurality of angled absorbers embedded in the filter substrate.

5. The optical combiner defined in claim 4, wherein the world light is incident upon the waveguide within a field of view, wherein the flare-inducing world light is incident upon the waveguide outside the field of view, and wherein the plurality of angled absorbers are oriented to block the flare-inducing world light incident outside the field of view without blocking the world light incident within the field of view.

6. The optical combiner defined in claim 3, wherein the angular filter comprises diffractive grating structures in the filter substrate.

7. The optical combiner defined in claim 6, wherein the world light is incident upon the waveguide at first angles within a field of view, wherein the flare-inducing world light is incident upon the waveguide at second angles outside the field of view, and wherein the diffractive grating structures are Bragg-matched to light incident upon the waveguide and are configured to diffract the flare-inducing world light away from the cross coupler.

8. The optical combiner defined in claim 7, wherein the diffractive grating structures comprise a grating structure selected from the group consisting of:
a thin-film hologram, a volume hologram, a meta-grating, and a surface relief grating.

9. The optical combiner defined in claim 1, wherein the angular filter comprises multiple sets of angled absorbers at different angles.

10. An optical system comprising:
a waveguide comprising:
  a first waveguide substrate; and
  a second waveguide substrate, the waveguide being configured to propagate image light via total internal reflection;
a grating medium interposed between the first and second waveguide substrates, wherein the grating medium has a first index of refraction;
an output coupler comprising volume holograms formed in the grating medium, the output coupler being configured to transmit real-world light while diffracting the image light within a field of view;
a cross coupler comprising a surface relief grating structure embedded within a surface relief grating substrate, the cross coupler being configured to diffract the image light towards the output coupler and the surface relief grating substrate having a second index of refraction greater than the first index of refraction;
a filter substrate layered over the first waveguide substrate; and
an angular filter in the filter substrate, wherein the angular filter is configured to prevent real-world light incident outside the field of view from passing through the filter substrate.

11. The optical system defined in claim 10, wherein the angular filter is configured to transmit the real-world light incident within the field of view.

12. The optical system defined in claim 11, wherein the first waveguide substrate is interposed between the filter substrate and the grating medium.

13. The optical system defined in claim 12, wherein the angular filter comprises structures selected from the group consisting of: diffractive grating structures configured to diffract the real-world light incident outside the field of view away from the first waveguide substrate and angled absorber structures oriented at an angle that configures the angled absorber structures to block the real-world light incident outside the field of view while transmitting the real-world light incident within the field of view.

14. The optical system defined in claim 10, wherein the first waveguide substrate is interposed between the filter substrate and the grating medium.

15. The optical system defined in claim 14, wherein the angular filter comprises structures selected from the group consisting of: diffractive grating structures and angled absorber structures.

16. The optical system defined in claim 10, wherein the cross coupler at least partially overlaps the angular filter.

17. A display comprising:
a waveguide configured to propagate image light via total internal reflection and configured to transmit world light, wherein the waveguide comprises first and second waveguide substrates;
a cross coupler comprising surface relief grating structures embedded within a third substrate, wherein the third substrate has a first index of refraction, wherein the third substrate is layered over the first waveguide substrate, and wherein the surface relief grating structures are configured to diffract the image light;
an output coupler comprising diffractive gratings formed in a grating medium, wherein the grating medium is interposed between the first and second waveguide substrates, wherein the grating medium has a second index of refraction less than the first index of refraction, and wherein the diffractive gratings are configured to couple the image light out of the waveguide; and
an angular filter on the waveguide and at least partially overlapping the surface relief grating structures, wherein the angular filter is configured to block, from passing to the surface relief grating structures, world light at an incident angle that produces a flare.

18. The display defined in claim 17, wherein the angular filter comprises structures selected from the group consisting of: diffractive grating structures and angled absorber structures.

19. The display defined in claim 17, wherein the angular filter is formed in a fourth substrate, the fourth substrate is separated from the third substrate by an air gap, and the display further comprises a spacer in the air gap that separates the fourth substrate from the third substrate.

20. The display defined in claim 17, wherein the angular filter is non-overlapping with the cross coupler.

* * * * *